(12) United States Patent
Zhang et al.

(10) Patent No.: US 6,354,663 B1
(45) Date of Patent: Mar. 12, 2002

(54) LATCHING SYSTEM

(75) Inventors: Xinhui Zhang, Canton; Ajay Wani, Westland, both of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/546,004

(22) Filed: Apr. 8, 2000

(51) Int. Cl.$^7$ ................................................. B60N 2/00
(52) U.S. Cl. ......................................................... 297/336
(58) Field of Search ................................ 297/325, 326, 297/316, 331, 335, 336, 378.1, 378.13; 296/65.01, 65.05; 29/428

(56) References Cited

U.S. PATENT DOCUMENTS

| | | | |
|---|---|---|---|
| 5,498,051 A | * | 3/1996 | Sponsler et al. |
| 5,634,686 A | * | 6/1997 | Okazaki |
| 5,915,779 A | * | 6/1999 | Duchateau |
| 5,961,183 A | * | 10/1999 | Smith et al. |
| 6,135,555 A | * | 10/2000 | Liu et al. |
| 6,161,890 A | * | 12/2000 | Pesta et al. |
| 6,183,032 B1 | * | 2/2001 | Champ |

* cited by examiner

Primary Examiner—Milton Nelson, Jr.
(74) Attorney, Agent, or Firm—Foley & Lardner

(57) ABSTRACT

A latching system for a seat assembly engageable with a seat striker comprising a latch plate coupled to the seat assembly, and a striker support coupled to the latch plate. The striker support is engageable with a top surface of the seat striker to reduce squeak and rattle. Further, the striker support is adjustable relative to the latch plate to accommodate a predetermined range of placement tolerances of the seat striker relative to the latching system.

17 Claims, 4 Drawing Sheets

LATCHING SYSTEM

TECHNICAL FIELD OF THE INVENTION

This invention generally relates to latching systems for seat assemblies engageable with a seat striker. More specifically, this invention relates to latching systems to reduce squeak and rattle.

BACKGROUND

To allow for an increase in the cargo room, many manufacturers provide removable seat assemblies for their sport utility vehicles and mini-van vehicles. These removable seat assemblies typically attach to the vehicle floor through a front connection and a rear connection. To ensure that the removable seat assemblies securely fasten to the vehicle floor without causing squeaks and rattles during vehicle travel, the manufacturers insist on very tight placement tolerances of the front connection relative to the rear connection. These very tight placement tolerances add cost to the vehicle, which is often passed down to the final customer.

SUMMARY OF THE INVENTION

Accordingly, this invention provides for a latching system which overcomes the problems and disadvantages of the conventional techniques in the art. The invention also provides for a latching system that reduces squeak and rattle. The invention also provides for a latching system that accommodates a greater range of placement tolerances of the front connection relative to the rear connection, thereby reducing cost.

Briefly, the invention includes a latch plate coupled to the seat assembly, and a striker support coupled to the latch plate. The striker support is engageable with a top surface of the seat striker to reduce squeak and rattle. Further, the striker support is adjustable relative to the latch plate to accommodate a predetermined range of placement tolerances of the seat striker relative to the latching system.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
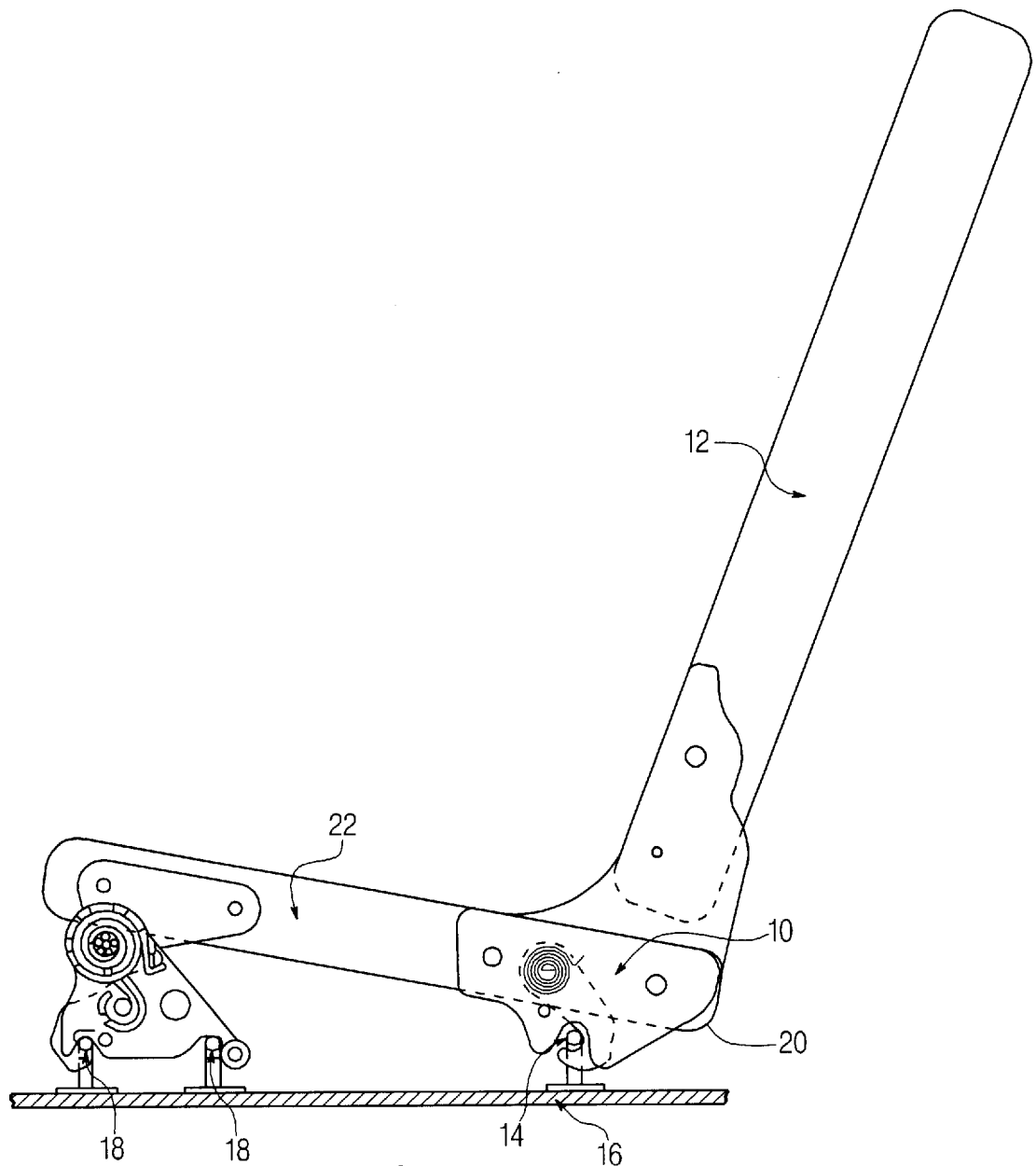
FIG. 1 is a side view of the latching system of the preferred embodiment of the invention fastened to a seat assembly.

As shown in FIG. 1, the latching system m 10 of the invention has been designed for a seat assembly 12 or other types of vehicle assemblies that are engageable with a seat striker 14. Although not required, the seat assembly 12 is typically arranged as a second or third row seat assembly for a sport utility vehicle or a mini-van vehicle. In these situations, the seat assembly 12 is typically removable from the vehicle to selectively increase cargo room. The seat assemblies 12 with removable features typically attach to a vehicle floor 16 through a connection with a front seat striker 18 and a rear seat striker 14. In a typical arrangement, the seat assembly 12 first attaches to the front seat striker 18 and then rotates downward towards the rear seat striker 14. By using the latching system 10 of the invention fastened to a rear portion 20 of a seat cushion 22 of the seat assembly 12, a greater range of placement tolerances of the rear seat striker 14 relative to the latching system 10 can be accommodated.

Figure 2:
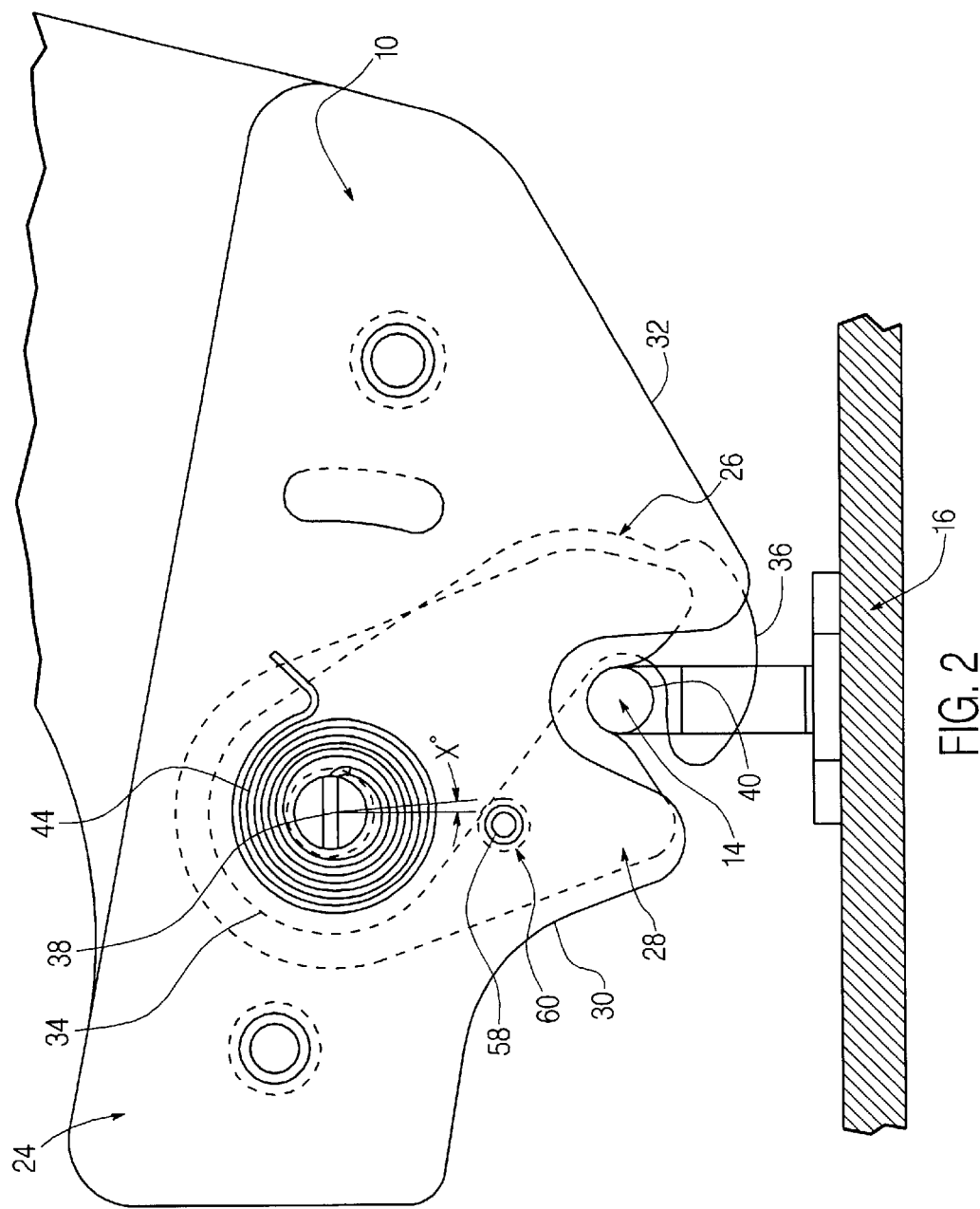
FIG. 2 is a side view of the latching system of FIG. 1, with the structure hook in the engaged position.

As shown in FIG. 2, the latching system 10 includes a latch plate 24, a structure hook 26, and a striker support 28. In the preferred embodiment, the latch plate 24 functions to fasten the latching system 10 to the seat assembly and to anchor the structure hook 26 and the striker support 28. In an alternative embodiment, the latch plate 24 may be integrally formed with the seat assembly or with other vehicle assemblies. The latch plate 24 includes a first projection 30 and a second projection 32. The first projection 30 and the second projection 32 are preferably spaced a predetermined distance to allow placement of the latching system 10 with the seat striker 14 between the first projection 30 and the second projection 12. The latch plate 24 is preferably made from a strong material, such as steel, and with conventional methods, but may alternatively be made from other suitable materials and with other suitable methods.

Figure 3:
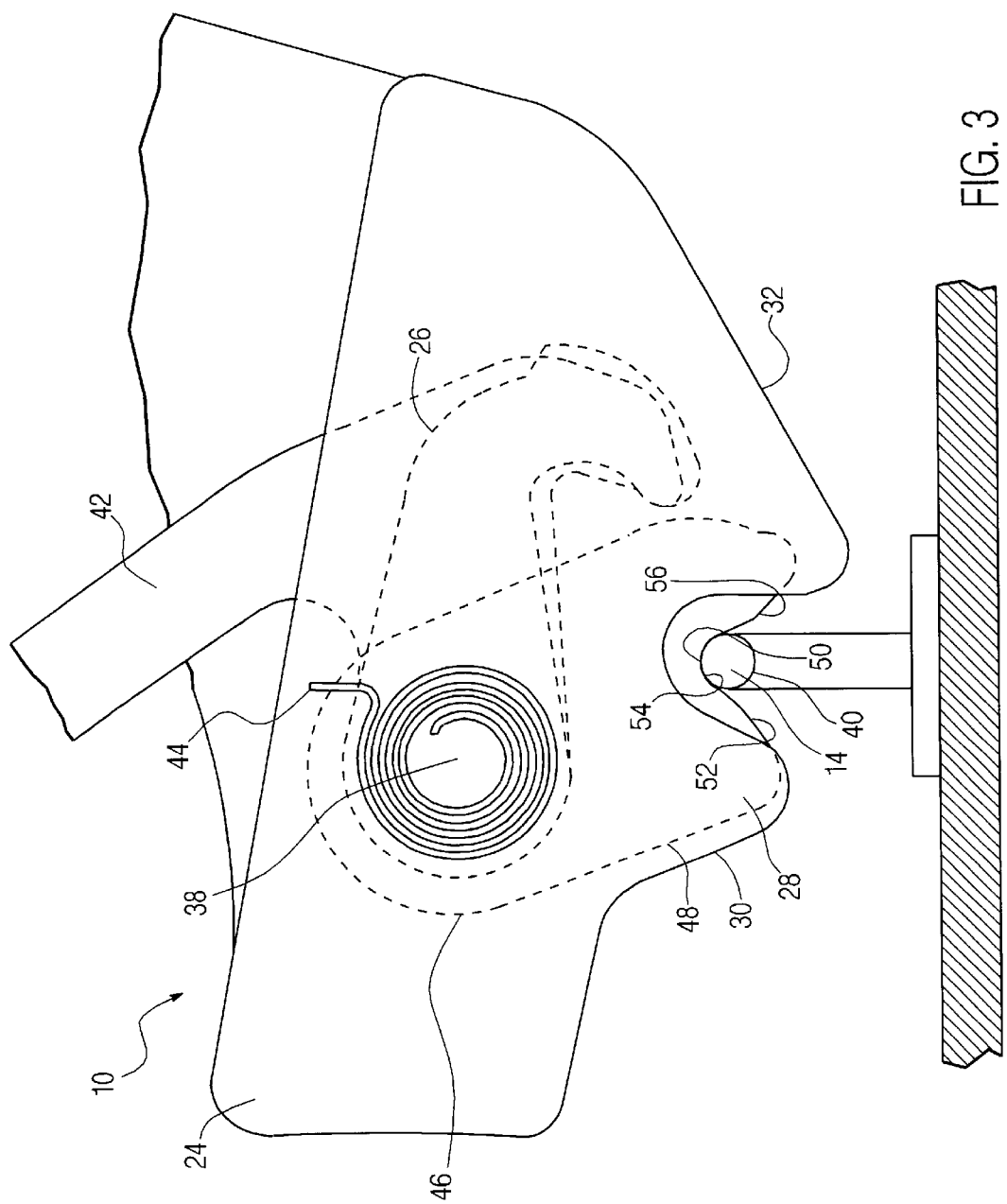
FIG. 3 is a side view of the latching system of FIG. 1, with the structure hook in the disengaged position.

The structure hook 26 functions to hold the latching system 10 and the seat assembly against the seat striker 14. The structure hook 26 preferably includes a base portion 34 and a hook portion 36. The base portion 34 is preferably coupled to the latch plate 24 for rotational movement about a pivot axis 38. The hook portion 36 is preferably integrally connected to the base portion 34 and preferably engageable with a bottom surface 40, or "first surface", of the seat striker 14. The structure hook 26 is preferably moveable between an engaged position and a disengaged position, as shown in FIG. 3. In the disengaged position, the structure hook 26 allows placement of the seat assembly with the seat striker 14 between the first projection 30 and the second projection 32. When moved into the engaged position, as shown in FIG. 2, the structure hook 26 engages the bottom surface 40 of the seat striker 14 to hold the seat assembly against the seat striker 14. The structure hook 26 is preferably made from a strong material, such as steel, and with conventional methods, but may alternatively be made from other suitable materials and with other suitable methods.

As shown in FIG. 3, in the preferred embodiment, the latching system 10 includes an engagement lever 42 to selectively allow movement of the structure hook 26 between the engaged position and the disengaged position. The engagement lever 42 is preferably coupled to the latch plate 24 for rotational movement about the pivot axis 38, and is preferably coupled to the structure hook 26 to positively move the structure hook 26 into either the engaged position or the disengaged position. The positive movement of the structure hook 26 is preferably accomplished with a torsional spring 44, but may alternatively be accomplished with other suitable devices. In an alternative embodiment, the latching system 10 may include other suitable devices to selectively allow movement of the structure hook 26 between the engaged position and the disengaged position.

The engagement lever 42 is preferably made from a hard material, such as plastic or steel, and from conventional methods, but may alternatively be made from other suitable materials and from other suitable methods.

The striker support 28 functions to reduce squeak and rattle while simultaneously accommodating a predetermined range of placement tolerances of the seat striker 14 relative to the latching system 10. The striker support 28 preferably includes a base section 46 and a support section 48. The base section 46 is preferably coupled to the latch plate 24 for rotational movement about the pivot axis 38, but may alternatively be coupled to the latch plate 24 for rotational movement about another pivot axis (not shown) or coupled to the latch plate 24 for other types of movements. The support section 48 is preferably integrally connected to the base section 46, and is preferably engageable with a top surface 50, or "second surface", of the seat striker 14. In the preferred embodiment, the top surface 50 of the seat striker 14 is generally opposite the bottom surface 40 of the seat striker 14. In an alternative embodiment, the top surface 50 may be located approximately 150–210° from the bottom surface 40 as measured about the center of the seat striker 14.

In the preferred embodiment, the support section 48 of the striker support 28 includes a first surface 52, a second surface 54, and a third surface 56. The first surface 52 and the third surface 56 are preferably angled approximately 75° from each other. The second surface 54 is preferably curved with a radius similar to the radius of the seat striker 14. In an alternative embodiment, the support section 48 may be formed with other surfaces to adequately engage the top surface 50 of the seat striker 14 and thereby reduce squeak and rattle. The striker support 28 is preferably made from a hard material, such as plastic or steel, and with conventional methods, but may alternatively be made from other suitable materials and with other suitable methods.

Figure 4:
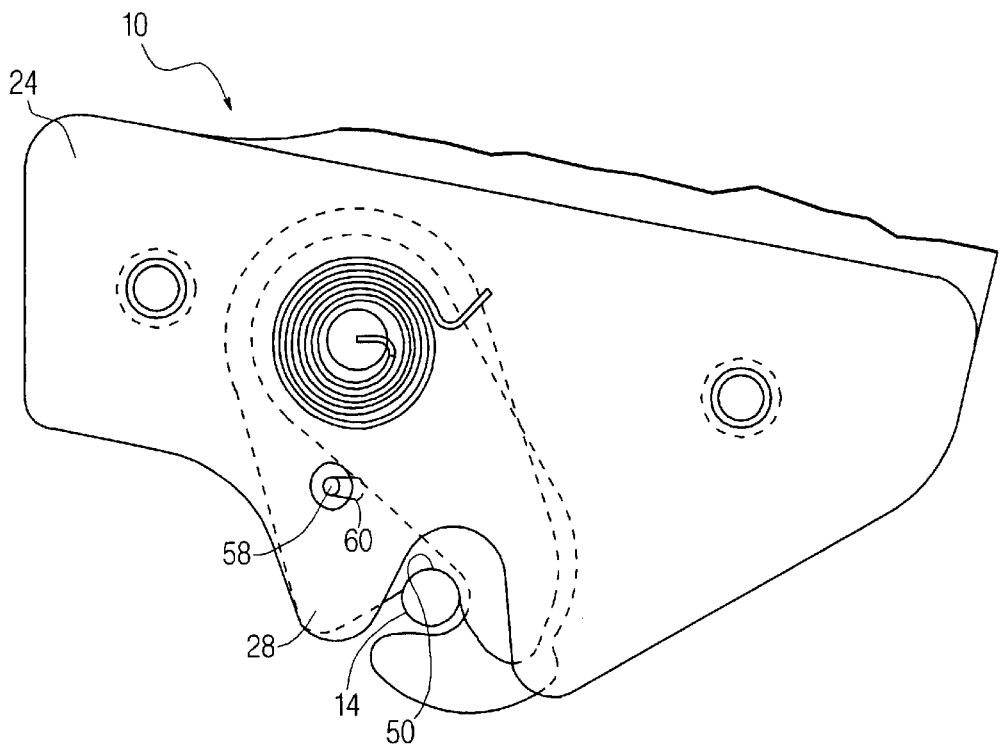
FIG. 4 is a side view of the latching system of FIG. 1, with the seat striker located near the front edge of the predetermined range of placement tolerances.

As shown in FIG. 4, in the preferred embodiment, the latching system 10 also includes a stop pin 58 to limit the rotational movement of the striker support 28. The stop pin 58 is preferably coupled to the striker support 28 and preferably moves within a pin slot 60 on the latch plate 24. The stop pin 58 may alternatively be coupled to the latch plate 24 and may alternatively slide within a pin slot (not shown) on the striker support 28. In alternative embodiments, the latching system 10 may use other suitable devices to limit the rotational movement of the striker support 28. The stop pin 58 is preferably made from a hard material, such as steel, and with conventional methods, but may alternatively be made from other suitable materials and with other suitable methods.

Figure 5:
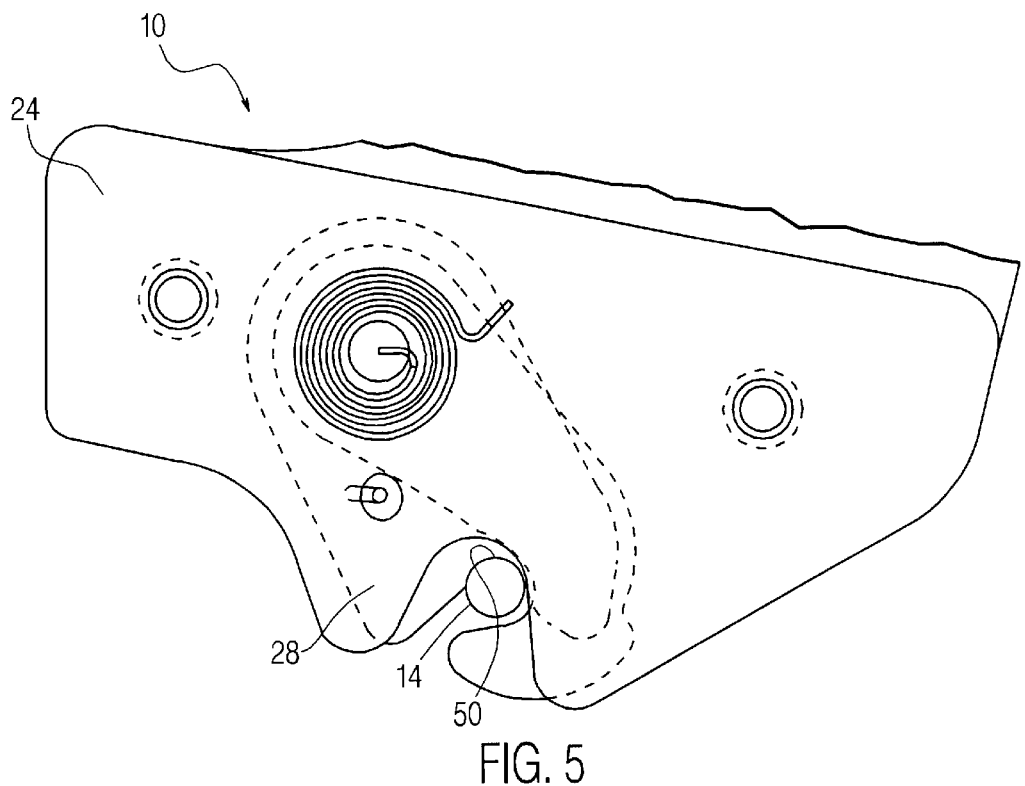
FIG. 5 is a side view of the latching system of FIG. 1, with the seat striker located near the rear edge of the predetermined range of placement tolerances.

As shown in FIGS. 4 and 5, the latching system 10 of the preferred embodiment of the invention accommodates a predetermined range of placement tolerances of the seat striker 14 relative to the latching system 10. In FIG. 4, the seat striker 14 is located near the front edge of the predetermined range of placement tolerances while, in FIG. 5, the seat striker 14 is located near the rear edge of the predetermined range of placement tolerances. In both extremes, the striker support 28 is adjustable relative to the latch plate 24 to engage the top surface 50 of the seat striker 14 to reduce squeak and rattle. By using the latching system 10 of the invention for a seat assembly engageable with a seat striker 14, a greater range of placement tolerances of the seat striker 14 relative to the latching system 10 can be accommodated.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A latching system for a seat assembly engageable with a seat striker, said latching system comprising:

a latch plate adapted to be coupled to the seat assembly;

a structure hook coupled to said latch plate for rotational movement about a pivot axis between an engaged position and a disengaged position, said structure hook being engageable with a first surface of the seat striker in the engaged position to hold the seat assembly against the seat striker; and a striker support coupled to said latch plate for rotational movement about said pivot axis, said striker support being engageable with a second surface of the seat striker generally opposite the first surface to reduce squeak and rattle, and said striker support being adjustable relative to said latch plate to accommodate a predetermined range of placement tolerances of the seat striker relative to the latching system.

2. The latching system of claim 1 further comprising a stop pin coupled to one of said striker support and said latch plate to limit the rotational movement of said striker support.

3. The latching system of claim 1 wherein said latch plate includes a first projection and a second projection, said first projection and said second projection being spaced a predetermined distance to allow placement of the latching system with the seat striker between said first projection and said second projection.

4. A latching system for a seat assembly engageable with a seat striker, said latching system comprising:

a latch plate adapted to be coupled to the seat assembly; and a striker support coupled to said latch plate, said striker support being engageable with a top surface of the seat striker to reduce squeak and rattle, and said striker support being adjustable relative to said latch plate to accommodate a predetermined range of placement tolerances of the seat striker relative to the latching system.

5. The latching system of claim 4 wherein said striker support is coupled to said latch plate for rotational movement about a pivot axis.

6. The latching system of claim 5 further comprising a stop pin coupled to one of said striker support and to said latch plate to limit the rotational movement of said striker support.

7. The latching system of claim 4 further comprising a structure hook coupled to said latch plate for movement between an engaged position and a disengaged position, said structure hook being engageable with a bottom surface of the seat striker in the engaged position to hold the seat assembly against the seat striker.

8. The latching system of claim 7 wherein said striker support is coupled to said latch plate for rotational movement about a pivot axis.

9. The latching system of claim 8 wherein said structure hook is coupled to said latch plate for rotational movement about said pivot axis.

10. The latching system of claim 7 further comprising an engagement lever coupled to said latch plate and to said structure hook to selectively allow movement of said structure hook between the engaged position and the disengaged position.

11. The latching system of claim 10 wherein said striker support is coupled to said latch plate for rotational movement about a pivot axis.

12. The latching system of claim 11 wherein said structure hook and said engagement lever are coupled to said latch plate for rotational movement about said pivot axis.

13. The latching system of claim 4 wherein said latch plate includes a first projection and a second projection, said first projection and said second projection being spaced a predetermined distance to allow placement of the latching system with the seat striker between said first projection and said second projection.

14. The latching system of claim 4 wherein said latch plate is adapted to be fastened to a rear portion of the seat assembly.

15. A method of providing a system for latching a seat assembly engageable with a seat striker, said method comprising:

providing a latch plate;

fastening the latch plate to the seat assembly;

providing a structure hook;

coupling the structure hook to the latch plate for rotational movement about a pivot axis between an engaged position and a disengaged position;

providing a striker support; and coupling the striker support to the latch plate for rotational movement about the pivot axis.

16. The method of claim 15 further comprising providing a stop pin, and coupling the stop pin to one of the striker support and the latch plate.

17. The method of claim 15 wherein providing the latch plate includes providing a latch plate with a first projection and a second projection.

* * * * *